3,111,448
BONDING BUTYL RUBBER TO NYLON
Pliny O. Tawney, Passaic, N.J., assignor to United States Rubber Company, New York, N.Y., a corporation of New Jersey
No Drawing. Filed Feb. 3, 1959, Ser. No. 790,810
16 Claims. (Cl. 161—92)

This invention relates to new high temperature adhesives for bonding butyl rubber to nylon textile materials, the methods of effectuating such bonding, and the products so formed.

Heretofore it has been extremely difficult to bond butyl rubber to nylon, and the bonds have been weak at the high temperatures, e.g., 250–300° F., reached inside an automobile tire in operation.

Many adhesives which contain resorcinol or its reaction products with formaldehyde are known. See, e.g., Charch and Maney U.S. Patents 2,128,229 and 2,128,635; Jordan U.S. Patent 2,188,736. They are used to bond various textile materials to rubbers. However, in general they are not suitable for bonding butyl rubber to textile materials such as nylon, because the bond is not strong enough at high temperatures to be useful in tires. Perhaps the best is Esso's experimental butyl latex mixed with resorcinol and formaldehyde, but it is hardly good enough for tires. It is described by A. L. Miller et al., Rubber World 137, 397–403, 460 (1957). The adhesion data given therein are for adhesive bond strengths at room temperature only; i.e., no data are given for adhesion at high temperatures, e.g., 250° F., attained inside a tire.

Thus, it has been impossible to build a serviceable tire in which butyl rubber was bonded directly to nylon tire cord. Such a tire, especially an all-butyl tire, would be extremely valuable because of the extraordinary resistance of butyl to attack by oxygen, the quietness of butyl treads on the road, and the fact that no inner tube nor special inner lining is needed to retain air in the tire. This invention solves the problem of bonding butyl rubber directly to nylon textile materials and allows one to make tires and other products in which the bond between butyl rubber and nylon cord retains very high strength when hot.

The invention consists of a cement or dispersion comprising (1) a compound selected from the class consisting of the dihydric phenols of the benzene and naphthalene series; and (2) a phenolic dialkanol material selected from the class consisting of (a) compounds having the structure (I)

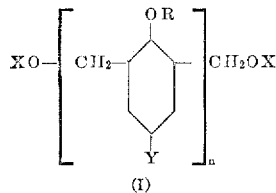

(I)

where R and X independently are chosen from hydrogen and lower acyl, and where Y is chosen from alkyl, cycloalkyl, aryl, aralkyl, chloro, and nitro, and $n$ is an integer in the range from one to three inclusive; (b) self-condensation polymers of those compounds of Formula I in which R and X are hydrogen and wherein Y is chosen from alkyl, cycloalkyl, aryl and aralkyl, and $n$ is one; and (c) compounds having the structure II

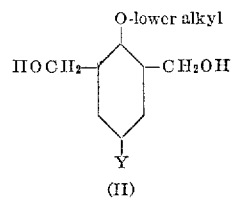

(II)

where Y is the same as in structure I. In another aspect the invention consists of the method of bonding butyl rubber to nylon by this cement or dispersion, and the composite articles thus formed, wherein the butyl contains a curing agent selected from the class consisting of the self-condensation polymers defined in "b" above, and the monomers corresponding to said polymers. More particularly, the method of the invention comprises building up alternating layers of nylon textile material and butyl rubber coated with my novel adhesive, and heating the composite material to vulcanize the butyl rubber and form a unitary, cohesive article.

The term "lower" refers to alkyl groups containing not more than four carbon atoms. When the material "I" contains more than one group Y the groups can be alike or different.

Optionally, the materials I and II also may have methyl groups in the 3- and 5-positions, numbering from the OR or O-lower alkyl group in the 1-position.

By definition, in this invention the "self-condensation polymers" are the materials which are formed from the defined compounds by heating them, in the presence or absence of an alkaline or acidic catalyst, to such a temperature that water and/or formaldehyde is evolved.

The term butyl rubber as used herein refers to that known class of synthetic rubbers typically made by low temperature copolymerization of an isoolefin with a minor amount of a multi-olefinic unsaturate. The isoolefins used generally have from 4 to 7 carbon atoms, and such monoisoolefins as isobutylene and 2-methyl-2-butene are preferred.

The multi-olefinic unsaturate is generally a conjugated diolefin usually having from 4 to 8 carbon atoms. The most important of these diolefins are isoprene and butadiene; others are piperylene, 2,3-dimethylbutadiene, 3-methyl-1,3-pentadiene, 2-methyl-1,3-pentadiene, 1,3-hexadiene and 2,4-hexadiene. The basic copolymer may be modified, if desired, either by including other copolymerizable materials such as chloroprene, allyl chloride or methallyl chloride in the original preparation of the copolymer, or by treating the previously prepared copolymer with reactive reagents such as maleic anhydride, bromine or chlorine. Thus, the content of isoolefin may vary from 80 to 99.5%, depending on whether additional monomers are present. If there is no additional modifying comonomer present, the isoolefin content usually amounts to from 90 to 99.5%. Hence, the expressions "butyl rubber," or "rubbery copolymer of an isoolefin with from 0.5 to 10% of a diolefin," or similar expressions, as used herein therefore contemplates the various known modified forms of a butyl rubber copolymer, as well as the unmodified copolymer.

Typical methods of compounding and curing the butyl rubber are given by Tawney et al. in U.S. Patent 2,701,895 issued on February 15, 1955, and in copending application of Viohl, Serial No. 644,980, filed March 11, 1957, now Patent No. 2,918,448.

The dihydric phenols of the benzene and naphthalene series which I use in my adhesives include benzenediols, e.g., catechol and the preferred resorcinol and hydroquinone; and naphthalenediols, e.g., 1,2-naphthalenediol, 1,4-naphthalenediol, 1,5-naphthalenediol, etc. These phenols include those which have alkyl groups in addition to the two free hydroxyl groups. Typical substituted phenols are p-tert-butylcatechol, toluhydroquinone, 2,5-di-tert-butylhydroquinone, orcinol, 2-methyl-1,4-naphthalenediol, and 4-n-hexylresorcinol.

Typical compounds which have the structure I are the preferred 2,6-dimethylol-4-tert-butylphenol, and 2,6-dimethylol-4-methylphenol;
2,6-dimethylol-4-cyclohexylphenol;
2,6-dimethylol-4-benzylphenol;
2,6-dimethylol-4-alpha,alpha-dimethylbenzylphenol;
2,2'-methylene-bis-(4-tert-butyl-6-methylolphenol);
2,2'-methylene-bis-(4-chloro-6-methylolphenol);
2,6-bis-(2-hydroxy-3-methylol-5-tert-butylbenzyl)-4-tert-butylphenol;
2,6-bis-(acetoxymethyl)-4-tert-butylphenol;
2,6-bis-(acetoxymethyl)-4-tert-butylphenyl acetate;
2,2'-methylene-bis-(4-nitro-6-acetoxymethylphenol);
2,6-bis-(2-hydroxy-3-acetoxymethyl-5-tert-butylbenzyl)-4-tert-butylphenol;
2,6-bis-(2-acetoxy-3-acetoxymethyl-5-tert-butylbenzyl)-4-tert-butylphenyl acetate; and
2,6-bis-(propionoxymethyl)-4-tert-tert-octylphenol.

The hydrocarbon radicals comprising the Y substituents of structural Formulas I and II may in turn bear substituents, viz., such groups as nitro, halogen, carboxyl, cyano, carboxyester and carboxamide. The maximum acceptable number of carbon atoms in the Y substituent is twelve, as exemplified by the dodecyl $[CH_3(CH_2)_{11}-]$ group.

The methylol compounds of structural class I can be made as shown by Tawney et al. in U.S. Patent 2,701,895 issued February 15, 1955, and in copending application of Viohl, Serial No. 644,980, filed March 11, 1957. The acylates whose phenolic groups are free can be made as shown in U.S. Patent 2,830,970 (issued April 15, 1958 to Tawney). The acylates whose phenolic groups and whose methylol groups are esterified can be made as shown in U.S. Patent 2,825,720 (issued March 4, 1958, to Tawney).

Typical, commercially available self-condensation polymers are Super Beckacites 1001 and 1003, which are said to be formed by alkaline-catalyzed reaction between 4-tert-butylphenol and formaldehyde, and Amberol ST-137, which is said to be formed by the alkaline-catalyzed reaction between 4-tert-tert-octylphenol and formaldehyde. Self-condensation polymers can also be made by heating the corresponding monomeric 2,6-dimethylolphenols, either alone or in the presence of a small amount of acid or alkali, as shown in U.S. Patent 2,701,895, Example 7.

Typical compounds which have the structure II are ethyl 2,6-dimethylol-4-methylphenyl ether and methyl 2,6-dimethylol-4-tert-butylphenyl ether. They can be made as shown by van der Meer, Rubber Chem. Tech. 18, 868 (1945).

The adhesive composition can be used either as an aqueous dispersion or as a solution in a solvent medium. An aqueous dispersion can best be used when the methylolated material is a condensation polymer, although the polymers also can be used in solution. The monomeric dimethylolphenols are most often used in solution.

Dispersions are easily made by grinding the solid condensation polymer with water and a small amount (0.025 to 1.0% by weight based on the polymer) of dispersing agent such as methylcellulose in, say, a paint mill or by some other conventional means. The dihydric phenol can be dispersed or dissolved in the medium in the step of dispersing the condensation polymer. Alternatively, if the dihydric phenol is quite soluble in water, e.g., catechol, resorcinol or hydroquinone, it can be added to the previously formed dispersion.

When the adhesives are used in the form of a solvent cement the choice of a solvent medium will depend on the solubility characteristics of the particular solute mixture of dihydric phenol and dimethylol material used. No rigid specifications can be made because this solute mixture can be varied exceedingly widely. Particular media suitable for any particular solute mixture can be found easily by experiment. The working examples show how to carry out such experiments, and show typical solvent-solute formulations. Other solvents operable in this invention include the ketones (e.g., methyl ethyl ketone), esters (e.g., ethyl acetate), aliphatic ethers (e.g., diethyl ether), and the cyclic ethers such as dioxane and tetrahydrofuran.

In practical embodiments of the invention nylon tire cord is passed through the solution or dispersion of the adhesive mixture, dried at room temperature or in a hot-air oven, and built conventionally into a butyl carcass of a tire. The tire is then assembled and cured conventionally. The curing agent in the carcass must be one of the phenol dialcohols which cures at a practical rate, such as the curing agents disclosed in U.S. Patent 2,701,895. These curing agents may be described as condensation polymers of 2,6-dimethylol-4-hydrocarbonphenols (i.e., multicyclic) and the monomers corresponding to said polymers (i.e., monocyclic).

Examples of monocyclic phenol dialcohols include 2,6-dimethylol-4-tert-butylphenol; 2,6-dimethylol-4-phenylphenol; 2,6-dimethylol-4-benzylphenol; 2,6-dimethylol-4-alpha,alpha-dimethylbenzylphenol and many others wherein the para substituent is hydrocarbon radical.

Multicyclic phenol dialcohols are condensation polymers which can be formed as shown in the Carswell volume entitled "Phenoplasts" published by Interscience Publishers, New York, 1950, on pp. 17–22 by heating the corresponding monocyclic dialcohol.

The rate at which the cord is passed through the adhesive can be varied widely without adversely affecting the adhesion. However, at a high speed the cord picks up more adhesive than at a lower one. As the amount of dried adhesive on the cord should be held within certain limits it is necessary to use a somewhat more dilute solution or dispersion of the adhesive when running at high speed than when running at lower speed.

Exact limits for the invention cannot be given because of the great number of combinations of dihydric phenols and methylolated materials, and because of the various conditions under which the adhesives are to be used. Therefore, one important embodiment of the invention will now be described, limits concerning this embodiment will be set, and indications as to how to apply these findings to other embodiments of the invention will be given.

This embodiment has to do with the use of adhesive mixtures of resorcinol and 2,6-dimethylol-4-tert-butylphenol, in proportions ranging from about 20:80 to about 80:20 (by weight).

The solid content of the adhesive solution can range between about 5% and about 15% by weight. The amount of adhesive picked up by cord travelling through a bath of such an adhesive solution at a speed of 2–16 yards per minute will be within the acceptable limit of from about 0.75% to about 5% of dried adhesive based on the weight of the cord. If the pickup is less than about 0.75% or materially more than about 5%, adhesion will be poor.

The adhesive solution may be used immediately after preparation or it may be kept for weeks at room temperature without deterioration.

The dipped cords may be dried at room temperature or at elevated temperature under conditions at least as drastic as an hour at 250° F. without harm. Indeed, the coated cords have been dried as high as 300° F. without causing any adverse effect on the final adhesion. At a temperature of 250° F. not only does the adhesive become dried, but also the solid materials react to form an alcohol-insoluble resin on the cord. The time required to drive off the carrier liquid for the adhesive components varies inversely with the temperature, and is determined by experiment. Generally, 3 minutes at 300° F. is sufficient for an 80:20 mixture of 95% ethanol and water whereas at 250° F. a reasonable drying time for this same mixture would be 15 minutes.

The following examples illustrate the invention. Adhesive strengths were determined by the so-called "H-test" described by Lyons, Nelson and Conrad—India Rubber World, 114, 213 et seq. (1946)—at 250° F. and in many cases at room temperature. In all pairs the adhesion at room temperature was much higher than that at 250° F. Comparison between the H-test and road tests of tires showed that if the H-adhesion at 250° F. was at least about 10 pounds the adhesion of the cord to the rubber in the tire would be adequate both at ambient air temperature and at the high temperatures normally found in a tire carcass during operation. Therefore, for brevity in the following examples only the H-adhesion at 250° F. will be shown. All parts and percentages are by weight.

*Example 1*

An 840/2-ply nylon tire cord of conventional construction was passed under slight tension through the different adhesive solutions described below at a rate of six feet per minute, and was then dried, while still under tension, for three minutes in air at 300° F. Then the coated cord was embedded, in an H-test mold, in a conventional, uncured butyl stock containing a phenol dialcohol curing agent, and the assembly was heated in a mold for 60 minutes at 166° C. The H-adhesion at 250° F. then was determined.

The butyl stock was made as follows:

A masterbatch was mixed in a Banbury internal mixer in the proportion of 100 parts of IIR (formerly called "GR-I," a commercial butyl rubber made from isobutylene and isoprene), 40 parts of carbon black, and 1.4 parts of Super Beckacite 1001. The mixture then was masticated for 10 minutes in the Banbury at 350° F. in order to lower the hysteresis of the ultimate cured stocks. It then was mixed on a rubber mill with 5 parts of zinc stearate, 2.5 parts of paraffinic oil, and 8.6 parts of Super Beckacite 1001.

The adhesive solutions, including all the controls except those for specimens 1 and 2, contained 10% solids by weight. The solvent in all cases was an 80:20 mixture of 95% ethanol and water.

| Specimen | Adhesive | H-adhesion (lbs.) |
|---|---|---|
| 1 | Solvent Alone | 7.1 |
| 2 | Esso butyl latex a | 6.1 |
| 3 | Resorcinol | 5.7 |
| 4 | 2,6-Dimethylol-4-tert-butylphenol | 6.3 |
| 5 | 2,6-Dimethylol-4-tert-butylphenol: Resorcinol (50:50). | 15.3 |
| 6 | 2,6-Dimethylol-4-tert-butylphenol: Resorcinol, (80:20). | 14.3 |
| 7 | 2-6-Dimethylol-4-tert-butylphenol: Resorcinol, (20:80). | 13.7 | a This was used, with resorcinol and formaldehyde, according to the directions given by Esso Standard Oil Company for bonding sulfur-cured butyl to nylon or rayon.

This example shows that my new adhesive compositions are much stronger than either the Esso adhesive or other adhesives consisting of either resorcinol or 2,6-dimethylol-4-tert-butylphenol alone. Only specimens 5–7 illustrate this invention. Specimens 1–4 are controls.

*Example 2*

These specimens were made and tested as was specimen 5 of Example 1 except that the composition of the solvent was varied as shown.

| Specimen | Solvent | H-adhesion (lbs.) |
|---|---|---|
| 5 | 95% ethanol: H₂O (80:20) | 15.3 |
| 8 | 95% ethanol: H₂O (50:50) | 16.3 |
| 9 | 95% ethanol: H₂O (30:70) | 14.6 |
| 10 | Isopropanol: H₂O (80:20) | 14.5 |
| 11 | Isopropanol: H₂O (50:50) | 13.9 |

This example shows that the solvent medium of the adhesive solution can be modified extensively without greatly affecting adhesion.

*Example 3*

These specimens were made and tested as was specimen 5 of Example 1 except that the dihydric phenol was varied.

| Specimen | Dihydric Phenol | H-adhesion (lbs.) |
|---|---|---|
| 12 | Hydroquinone | 13.1 |
| 13 | Catechol | 14.5 |
| 14 | 1,5-Dihydroxynaphthalene | 14.1 |
| 15 | p-Tert-butylcatechol | 12.7 |

This example illustrates the use of several typical dihydric phenols which can be used as one of the components of the adhesive mixture.

*Example 4*

These specimens were made and tested as was specimen 5 of Example 1 except that various phenoldialcohols were used.

| Specimen | Phenol Dialcohol | H-adhesion (lbs.) |
|---|---|---|
| 16 | 2,6-Dimethylol-4-tert-tert-octylphenol | 15.2 |
| 17 | 2,2'-Methylenebis-(4-chloro-6-methylolphenol). | 14.5 |
| 18 | 2,2'-Methylenebis-(4-chloro-6-methylolphenol) (2.5 parts and 2.5 parts of resorcinol in 95 parts of the solvent). | 12.9 |
| 19 | 2,2'-Methylene-bis-(4-tert-butyl-6-methylolphenol). | 12.7 |
| 20 | 2,6-Bis-(2-hydroxy-3-methylol-5-tert-butyl-benzyl)-4-tert-butylphenol. | 12.1 |
| 21 | 2,6-Bis-(2-hydroxy-3-methylol-5-ethylbenzyl)-4-ethylphenol. | 12.3 |
| 22 | 2,6-Dimethylol-4-chloro-phenol | .9 |

The above example demonstrates the practice of this invention with formulations of adhesives made from a variety of mononuclear, binuclear, and trinuclear phenol dialcohols.

*Example 5*

These nylon-butyl specimens were made and tested as was specimen 5 of Example 1 except that the total solids content of the adhesive solutions was varied. To determine the amount of adhesive picked up, part of each dried cord was exhaustively extracted with warm 95% ethanol (10 minutes), and the amount of resorcinol and 2,6-dimethylol-4-tert-butylphenol in the extract was measured by ultra violet absorption (this method is more accurate than a direct determination of the increase in weight of the cord when the combination of drying time and drying temperature is too mild to cause formation of alcohol-insoluble resorcinol 2,6-dimethylol-4-tert-butylphenol resin; the ultra violet absorption method is unsuitable when the cord is dried for, say, an hour at 300°

F. because of this resin formation). Another part of the dried cord was made into H-test pieces and tested.

| Specimen | 23 | 24 | 25 | 26 | 27 |
|---|---|---|---|---|---|
| Total solids (percent) | 5 | 10 | 15 | 20 | 30 |
| Adhesive pickup (percent of cord weight) | 0.86 | 3.04 | 4.66 | 6.24 | 8.5 |
| H-adhesion (lbs.) | 12.1 | 14.3 | 13.1 | 7.7 | 3.5 |

This example shows that the amount of dried adhesive on the cord is critical and should not exceed a maximum of about 5% based on the weight of the cord. Only specimens 23–25 illustrate this invention.

*Example 6*

These nylon-butyl specimens were made and tested as was specimen 5 of Example 1, except as shown individually. In each experiment equal weights of Amberol ST-137 and resorcinol were dissolved or dispersed in the medium. All amounts are given in parts by weight.

| Ingredients in Adhesive Solution | Specimen 28 | Specimen 29ª | Specimen 30ª |
|---|---|---|---|
| Amberol ST-137 ......... parts | 3.75 | 2.50 | 5.00 |
| Resorcinol ............... do | 3.75 | 2.50 | 5.00 |
| 95% Ethanol ............. do | 56.4 | | |
| Xylene ................... do | 36.1 | | |
| Water .................... do | | 95.0 | 90.0 |
| Methocel ................. do | | 0.025 | 0.050 |
| H-Adhesion (lbs.) | 15.1 | 14.0 | ᵇ 12.3 |

ª Dispersions were made in a paint mill, using "Methocel" as dispersing agent.
ᵇ Dipped cord was dried for 60 minutes at 250° F.

This example demonstrates the practice of this invention using a typical adhesive formulation which can be applied either as an aqueous dispersion or as a solution in a mixture of ethanol and xylene.

*Example 7*

These specimens were made and tested as was specimen 5 of Example 1 except that various esters of phenol dialcohols were used.

| Specimen | Phenol Dialcohol ester | H-adhesion (lbs.) |
|---|---|---|
| 31 | 2,6-Bis-(acetoxymethyl)-4-tert-butylphenol | 11.9 |
| 32 | 2,6-Bis-(acetoxymethyl)-4-tert-tert-octylphenol | 13.3 |
| 33 | 2,2'-Methylene-bis-(4-nitro-6-acetoxymethylphenol) | 11.6 |
| 34 | 2,6-Bis-(acetoxymethyl)-4-tert-butylphenyl acetate | 12.9 |

This example shows that derivatives of phenol dialcohols, wherein the methylol groups and/or the phenol groups are esterified, can be used in the practice of this invention.

*Example 8*

These specimens were made and tested as was specimen 5 of Example 1 except that (a) methyl 2,6-dimethylol-4-tert-butyl-phenyl ether was used instead of the corresponding free phenol, (b) the proportion of resorcinol: ether was varied as shown, (c) the total solid content of the adhesive solution was varied as shown, and (d) the solvent was p-dioxan.

| Ingredients in Adhesive Solution | Specimen | | | | |
|---|---|---|---|---|---|
| | 34 | 36 | 37 | 38 | 39 |
| Methyl 2,6-dimethylol-4-tert-butyl-phenyl ether .......... parts | 2.5 | 1.0 | 8.0 | 5.0 | 2.0 |
| Resorcinol ............... do | 2.5 | 4.0 | 2.0 | 5.0 | 8.0 |
| Dioxan ................... do | 95.0 | 95.0 | 90.0 | 90.0 | 90.0 |
| H-adhesion (lbs.) | 13.4 | 15.0 | 12.6 | 15.1 | 10.9 |

This example shows that a derivative of a phenol dialcohol, wherein the phenol group is etherified, can be used in the practice of this invention.

Having thus described my invention, what I claim and desire to protect by Letters Patent is:

1. A method of bonding nylon textile material to rubber, said rubber being a copolymer of an isoolefin with a minor amount of a multiolefinic unsaturate, comprising (A) passing said nylon textile material into and through a bath of adhesive composition comprising: (1) a compound selected from the group consisting of dihydric phenols of the benzene and naphthalene series, intimately mixed with (2) a phenolic dialkanol compound selected from the group consisting of (a) compounds having the structural Formula I

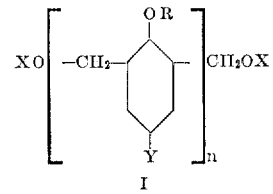

where R and X independently are selected from the group consisting of hydrogen atoms and acyl radicals having less than 4 carbon atoms, and where Y is selected from the group consisting of chlorine atoms, and alkyl, cycloalkyl, aryl, aralkyl, and nitro radicals, and $n$ is an integer in the range from one to three inclusive: (b) self-condensation polymers of those compounds of Formula I in which R and X are hydrogen atoms, $n$ is one, and Y is a hydrocarbon radical; and (c) compounds having the structural Formula II

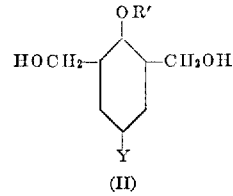

where R' is an alkyl group having less than four carbon atoms and Y is the same as in structural Formula I, the proportion of dihydric phenol to phenolic dialkanol being from 20:80 to 80:20 by weight; and (3) a liquid medium for the solid phenolic components, said solid components being from 5 to 15% of the total weight; (B) volatilizing the liquid medium from the coated nylon textile material; (C) placing the resulting adhesive-coated nylon textile material in direct and intimate contact with the unvulcanized rubber compounded with a resin-type curing agent selected from the group consisting of 2,6-dimethylol-4-hydrocarbonphenols and the self-condensation polymers thereof; and (D) curing the resulting rubber-nylon composite.

2. A method of bonding nylon textile material to rubber as in claim 1, wherein a self-condensation polymer of 2,6-dimethylol-4-hydrocarbonphenol is used as curing agent for the rubber.

3. A method of bonding nylon textile material to rubber, said rubber being a copolymer of an isoolefin with a minor amount of a multiolefinic unsaturate, comprising (A) passing said nylon textile material at a rate of from 2 to 16 yards per minute into and through a bath of adhesive composition comprising: (1) a compound selected from the group consisting of dihydric phenols of the benzene and naphthalene series intimately mixed with (2) a phenolic dialkanol compound having the structural formula

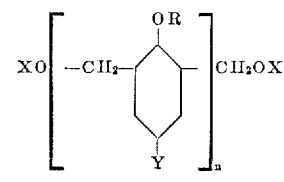

where R and X independently are selected from the group consisting of hydrogen atoms and acyl radicals having less that 4 carbon atoms, and where Y is selected from the group consisting of chlorine atoms, and alkyl, cycloalkyl, aryl, aralkyl, and nitro radicals, and $n$ is an integer in the range from one to three inclusive, the proportion of said dihydric phenol to phenolic dialkanol being from 20:80 to 80:20 by weight and (3) a liquid medium for the solid phenolic components, said solid components being from 5 to 15% of the total weight; (B) volatilizing the liquid medium from the coated nylon textile material; (C) placing the resulting adhesive coated nylon textile material in direct and intimate contact with the unvulcanized rubber compounded with a resin-type curing agent selected from the group consisting of 2,6-dimethylol-4-hydrocarbonphenols and the self-condensation of polymers thereof; and (D) curing the resulting rubber-nylon composite.

4. A method of bonding nylon textile material to rubber, said rubber being a copolymer of an isoolefin with a minor amount of a multiolefinic unsaturate, comprising (A) passing said nylon textile material at a rate of from 2 to 16 yards per minute into and through a bath of adhesive composition comprising: (1) a compound selected from the group consisting of dihydric phenols of the benzene and naphthalene series intimately mixed with (2) a phenolic dialkanol compound which is a self-condensation polymer of compounds having the structural formula

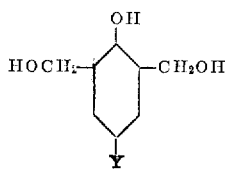

where Y is a hydrocarbon radical, the proportion of said dihydric phenol to said phenolic dialkanol being from 20:80 to 80:20 by weight, and (3) a liquid medium for the solid phenolic components, said solid components being from 5 to 15% of the total weight; (B) volatilizing the liquid from the coated nylon textile material; (C) placing the resulting adhesive coated nylon textile material in direct and intimate contact with the unvulcanized rubber which has been compounded with a resin-type curing agent selected from the group consisting of 2,6-dimethylol-4-hydrocarbonphenol and the self-condensation polymers thereof; and (D) curing the resulting rubber-nylon composite.

5. A method of bonding nylon textile material to rubber, said rubber being a copolymer of an isoolefin with a minor amount of a multiolefinic unsaturate, comprising (A) passing said nylon material at a rate of from 2 to 16 yards per minute into and through a bath of adhesive composition comprising: (1) a compound selected from the group consisting of dihydric phenols of the benzene and naphthalene series intimately mixed with (2) a phenolic dialkanol compound having the structural formula

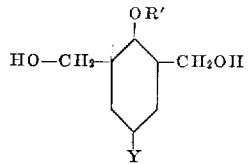

where R' is an alkyl group having less than four carbon atoms and Y is selected from the group consisting of chlorine atoms, and alkyl, cycloalkyl, aryl, aralkyl, and nitro radicals, the proportion of said dihydric phenol to said phenolic dialkanol being from 20:80 to 80:20 by weight, and (3) a solvent for the solid phenolic components, said solid components being from 5 to 15% of the total weight; (B) volatilizing the solvent from the coated nylon textile material; (C) placing the resulting adhesive coated nylon textile material in direct and intimate contact with the unvulcanized rubber which has been compounded with a resin-type curing agent selected from the group consisting of 2,6-dimethylol-4-hydrocarbonphenol and the self-condensation polymers thereof; and (D) curing the resulting rubber-nylon composite.

6. An adhesive composition for bonding rubber, said rubber being a copolymer of an isoolefin with a minor amount of a multiolefinic unsaturate, to nylon textile material comprising: (1) a compound selected from the group consisting of dihydric phenols of the benzene and naphthalene series intimately mixed with (2) a phenolic dialkanol material selected from the group consisting of (a) compounds having the structural Formula I

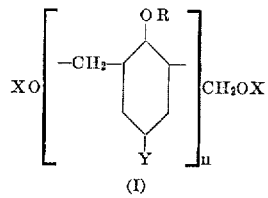

where R and X independently are selected from the group consisting of hydrogen atoms and acyl radicals having less than 4 carbon atoms, and where Y is selected from the group consisting of chlorine atoms, and alkyl, cycloalkyl, aryl, aralkyl, and nitro radicals, and $n$ is an integer in the range from one to three inclusive; (b) self-condensation polymers of those compounds of Formula I in which R and X are hydrogen atoms, $n$ is one, and Y is a hydrocarbon radical; and (c) compounds having a structural Formula II

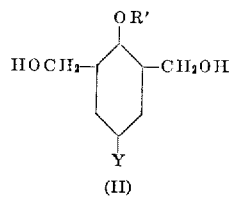

where R' is an alkyl group having less than four carbon atoms and Y is the same as in structural Formula I, the proportion of said dihydric phenol to said phenolic dialkanol being from 20:80 to 80:20 by weight; and (3) a liquid medium for the solid phenolic components, said solid components being from 5 to 15% of the total weight.

7. An adhesive composition for bonding rubber, said rubber being a copolymer of an isoolefin with a minor amount of a multiolefinic unsaturate, to nylon textile material comprising a compound selected from the group consisting of dihydric phenols of the benzene and naphthalene series intimately mixed with a phenolic dialkanol compound having the structural formula

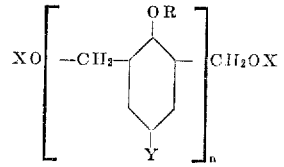

where R and X independently are selected from the group consisting of hydrogen atoms and acyl radicals having less than 4 carbon atoms, and where Y is selected from the group consisting of chlorine atoms, and alkyl, cycloalkyl, aryl, aralkyl, and nitro radicals; and $n$ is an integer in the range from one to three inclusive, the proportion of said dihydric phenol to said phenolic dialkanol being from 20:80 to 80:20 by weight and a liquid medium for the solid phenolic components, said solid components being from 5 to 15% of the total weight.

8. An adhesive composition for bonding rubber to nylon textile material as in claim 7, wherein the phenolic dialkanol is 2,6-dimethylol-4-tert-butylphenol.

9. An adhesive composition for bonding rubber to nylon textile material as in claim 8, wherein the dihydric phenol is hydroquinone.

10. An adhesive composition for bonding rubber to nylon textile material as in claim 8, wherein the dihydric phenol is resorcinol.

11. An adhesive composition for bonding rubber, said rubber being a copolymer of an isoolefin with a minor amount of a multiolefinic unsaturate, to nylon textile material comprising a compound selected from the group consisting of dihydric phenols of the benzene and naphthalene series intimately mixed with a phenolic dialkanol compound which is a self-condensation polymer of compounds having the structural formula

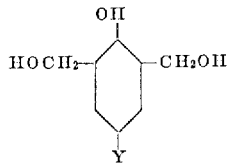

where Y is a hydrocarbon radical, the proportion of said dihydric phenol to said phenolic dialkanol being from 20:80 to 80:20 by weight, and a liquid medium for the solid phenolic components, said solid components being from 5 to 15% of the total weight.

12. An adhesive composition for bonding rubber, said rubber being a copolymer of an isoolefin with a minor amount of a multiolefinic unsaturate, to nylon textile material comprising a compound selected from the group consisting of dihydric phenols of the benzene and naphthalene series intimately mixed with a phenolic dialkanol compound having the structural formula

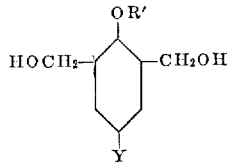

where R' is an alkyl group having less than four carbon atoms and Y is selected from the group consisting of chlorine atoms, and alkyl, cycloalkyl, aryl, aralkyl, and nitro radicals, the proportion of dihydric phenol to phenolic dialkanol being from 80:20 to 20:80 by weight, and a solvent for the solid phenolic components, said solid components being from 5 to 15% of the total weight.

13. A vulcanizate of alternate layers of rubber, said rubber being a copolymer of an isoolefin with a minor amount of multiolefinic unsaturate admixed with a resin-type curing agent selected from the group consisting of 2,6-dimethylol-4-hydrocarbonphenol and the self-condensation polymers thereof, and nylon textile material coated with from 0.75 to 5.0% by weight of an adhesive comprising (1) a compound selected from the group consist-ing of dihydric phenols of the benzene and naphthalene series and (2) a phenolic dialkanol compound selected from the group consisting of (a) compounds having the structural Formula I

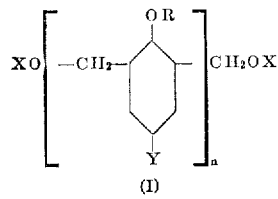

where R and X independently are selected from the group consisting of hydrogen atoms and acyl radicals having less than 4 carbon atoms, and where Y is selected from the group consisting of chlorine atoms, and alkyl, cycloalkyl, aryl, aralkyl, and nitro radicals, and $n$ is an integer in the range from one to three inclusive, (b) self-condensation polymers of those compounds of Formula I in which R and X are hydrogen atoms, $n$ is one, and Y is a hydrocarbon radical, and (c) compounds having the structural Formula II

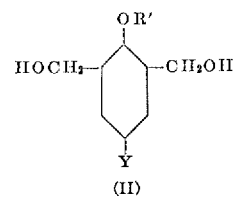

where R' is an alkyl group having less than four carbon atoms and Y is the same as in structural Formula I, the the proportion of dihydric phenol to phenolic dialkanol being from 20:80 to 80:20 by weight.

14. A vulcanizate as in claim 13, wherein a self-condensation polymer of 2,6-dimethanol-4-hydrocarbonphenol is employed as the resin-type curing agent for the rubber.

15. A vulcanizate as in claim 14, wherein the dihydric phenol (1) is hydroquinone and the phenolic dialkanol compound (2) is 2,6-dimethylol-4-tert-butylphenol.

16. A vulcanizate as in claim 14, wherein the dihydric phenol (1) is resorcinol and the phenolic dialkanol compound (2) is 2,6-dimethylol-4-tert-butylphenol.

References Cited in the file of this patent

UNITED STATES PATENTS

| | | |
|---|---|---|
| 2,346,290 | Loughborough | May 23, 1944 |
| 2,414,414 | Rhodes | Jan. 14, 1947 |
| 2,701,895 | Tawney et al. | Feb. 15, 1955 |
| 2,739,918 | Illingworth | Mar. 27, 1956 |
| 2,830,970 | Tawney | Apr. 15, 1958 |
| 2,839,443 | Fleming | June 22, 1958 |

UNITED STATES PATENT OFFICE
CERTIFICATE OF CORRECTION

Patent No. 3,111,448                        November 19, 1963

Pliny O. Tawney

It is hereby certified that error appears in the above numbered patent requiring correction and that the said Letters Patent should read as corrected below.

Column 9, line 3, for "that" read -- than --; line 16, strike out "of"; line 37, for "phenollc" read -- phenolic --; column 11, line 50, after "of" insert -- a --; column 12, line 34, after "I," strike out "the"; line 38, for "-dimethanol-" read -- -dimethylol- --.

Signed and sealed this 16th day of May 1964.

(SEAL)
Attest:

ERNEST W. SWIDER
Attesting Officer

EDWARD J. BRENNER
Commissioner of Patents